Jan. 4, 1927.                                                   1,613,231
W. S. LORD ET AL
CANDY CONFECTION AND PROCESS OF MAKING THE SAME
Filed Jan. 28, 1926
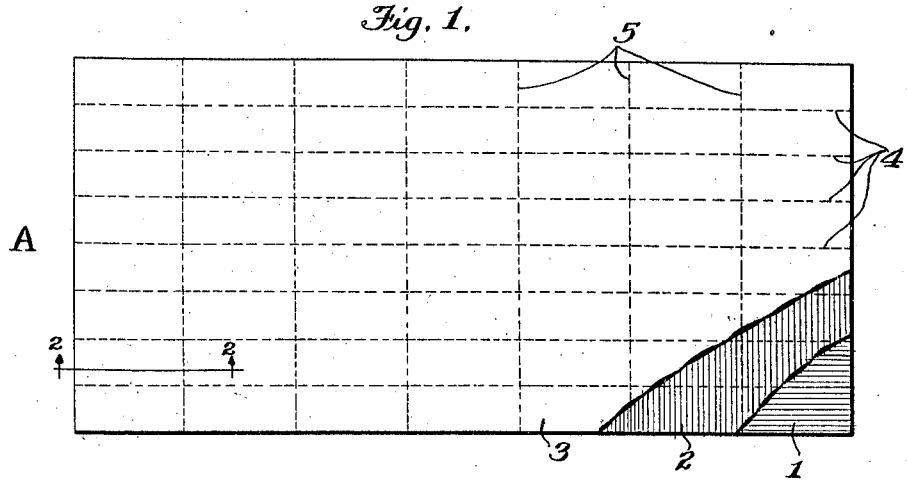
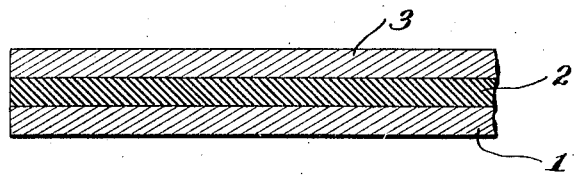
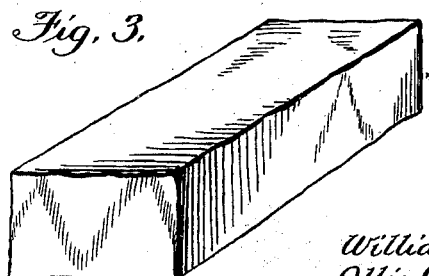
Inventors
William S. Lord and
Ollie Clyde Ashley Patented Jan. 4, 1927.

1,613,231

UNITED STATES PATENT OFFICE.

WILLIAM S. LORD, OF EVANSTON, AND OLLIE CLYDE ASHLEY, OF CHICAGO HEIGHTS, ILLINOIS, ASSIGNORS TO WILLIAMSON CANDY COMPANY, OF CHICAGO, ILLINOIS, A CORPORATION OF ILLINOIS.

CANDY CONFECTION AND PROCESS OF MAKING THE SAME.

Application filed January 28, 1926. Serial No. 84,354.

This invention relates to candy confections and to an improved process of making the same.

The object of the invention is to produce a candy confection comprising a layer of hard, frangible candy, which may be cut into pieces when cold, without dislodgment of pieces of said frangible sheet or layer of appreciable size, even though it is broken into pieces in the cutting operation, and without affecting the size and shape of the pieces into which the mat, as initially formed, is cut.

In accordance with our improved process, we attain the foregoing object by applying layers of candy having substantially the consistency of caramel candy, to both sides of a layer of hard, frangible candy, to form a composite mat of desired shape and size, and in then cutting said mat into pieces of desired shape and size, for commercial purposes, said outer layers forming bonding means for holding pieces of said intermediate layer together and in position, in case it is broken in cutting, handling, or otherwise.

Obviously, the character and consistency both of the intermediate and bonding layers of a composite candy confection embodying our invention and improvements may vary within a wide range, and we do not, therefore, limit ourselves to the use of any particular kinds or descriptions of candy, but desire to include within the scope of the invention any and all kinds and descriptions of candy possessing the characteristics and qualities requisite for the practice of our invention.

In the accompanying drawing, in which our improved confection and process are fully illustrated, Figure 1 is a plan view of a composite mat of candy, exemplifying a mat adapted for the practice of our improved process, portions thereof being broken away to expose underlying layers thereof, contemplated lines of severance into pieces of merchantable size being indicated in dotted lines.

Figure 2 is a fragmentary sectional view on an enlarged scale, on the line 2—2 of Fig. 1; and Figure 3 is a perspective view of a piece of candy embodying our invention and improvements, made in accordance with our improved process, exemplifying one form into which the composite mat, as initially formed, may be cut.

Describing our improved process and confection with reference to the drawings, A designates as a whole a composite mat consisting, as shown, of three layers of candy designated, respectively, 1, 2 and 3.

The middle layer 2 consists of hard, frangible candy, as butter brittle, which cannot be cut, when cold, without being broken into pieces of irregular size and shape.

In accordance with our improved process, the layers 1 and 3 are applied to the bottom and top sides, respectively, of the layer 2 and consist of candy having substantially the consistency of a caramel candy, said layers forming bonding means for holding pieces of said intermediate layer together and in position, in case it is broken in the cutting operation, or otherwise.

Heretofore, so far as we are aware, it has been considered impracticable, if not impossible, to cut layers of hard, frangible candy of the character of the layer 2 shown in the drawing, for the reason that the action of the knives or cutters would break the candy into irregular pieces; and, where it is desired to subdivide a layer of such hard, frangible candy into pieces of desired small size, the universal practice, so far as we are aware, has been to score said layers on lines corresponding to the desired shapes and sizes of the pieces, before it is thoroughly cooled and while it is sufficiently plastic that it may be scored without breaking. The candy is then permitted to cool and may then readily be broken into pieces along the lines on which it is scored.

This method of manufacture could not be practiced in the case of our improved product, however, for the reason that it would necessitate applying the top and bottom layers 1 and 3 to the individual pieces after they had been formed, which, while not impossible, would involve such large expense that it would be practically prohibitive as a quantity manufacturing proposition.

With a confection embodying our invention and manufactured in accordance with our improved process, it is possible to form the mat A from layers 1, 2 and 3, of any convenient size for handling and cutting—cutting being performed in any suitable form of candy cutter, preferably a rotary cutter—thus reducing the cost of manufacture to a point where the goods can be sold commercially at a reasonable price and still yield a profit.

In Figure 1 of the drawings the dotted lines 4 and 5 indicate the lines on which the mat A is to be cut.

After the mat A has been cut into pieces, each piece will preferably be coated with chocolate or other desired coating material, which may be done in accordance with usual practice.

In Figure 3 of the drawings we have shown one form in which our improved product may conveniently be made up for sale. We do not, however, desire to limit ourselves to this particular form, as the form of the piece may be varied or modified in any desired manner. Obviously, where the mat A is cut into pieces on a rotary cutter, it will be necessary to cut the mat A on straight lines.

Also, while we have herein shown and described our improved product as consisting of three layers, the number of layers may be increased without departure from our invention, it merely being necessary, when additional layers are added, to alternate the layers 2 of hard, frangible material with the layers 1 and 3 of bonding material.

We claim,—

1. The process of making a candy confection which consists in initially forming a composite mat comprising an intermediate layer of hard, frangible candy and bonding layers of candy having substantially the consistency of caramel candy applied to both sides of said intermediate layer, and in then cutting said mat into pieces of desired size and shape for commercial purposes.

2. A candy confection consisting of a layer of frangible candy, layers of candy having substantially the consistency of caramel candy applied to the top and bottom surfaces thereof, forming bonding means for holding pieces of the intermediate layer together should it be broken, thus providing for cutting the product into pieces.

In testimony that we claim the foregoing as our invention, we affix our signatures this 22nd day of January, 1926.

WILLIAM S. LORD.
O. C. ASHLEY.